United States Patent [19]

Bauer et al.

[11] Patent Number: 4,819,317

[45] Date of Patent: Apr. 11, 1989

[54] ARRANGEMENT FOR UNLOADING AND LOADING OF X-RAY FILM CASSETTES

[75] Inventors: Walter Bauer, Munich; Manfred Schmidt, Kirchheim; Herbert Plaschke, Gernlinden; Otto Butz, Neufahrn, all of Fed. Rep. of Germany

[73] Assignee: AGFA-Gevaert AG, Leverkusen, Fed. Rep. of Germany

[21] Appl. No.: 114,876

[22] Filed: Oct. 28, 1987

[30] Foreign Application Priority Data

Nov. 18, 1986 [DE] Fed. Rep. of Germany ....... 3639344

[51] Int. Cl.[4] .................. B23P 19/00; B23P 21/00
[52] U.S. Cl. ...................................... 29/407; 29/705; 29/714; 29/806
[58] Field of Search ................ 29/407, 705, 714, 806

[56] References Cited

U.S. PATENT DOCUMENTS 4,541,173  9/1985  Sakuma et al. ................ 29/806
4,694,571  9/1987  Kanai et al. ................... 29/806

FOREIGN PATENT DOCUMENTS 0052159  5/1982  Fed. Rep. of Germany .
3609527  5/1987  Fed. Rep. of Germany .

Primary Examiner—Timothy V. Eley
Attorney, Agent, or Firm—Michael J. Striker

[57] ABSTRACT

An arrangement for unloading and loading of x-ray sheet film cassettes of standardized but different sizes of their flat sides which also can be used for receiving different sheet film sorts and reloadable with respective sheet film sorts, comprises a light-tight closeable shaft for receiving a cassette, transporting unit for inserting and withdrawing of the cassettes, unit for positioning the cassette at a cassette corner which is the same for all cassettes, a mechanically-electronic comparison device for determining the format of a cassette, an opening device for the cassette, unit for withdrawing a film and inserting of a new film into the cassette, and unit for automatically distinguishing of cassette types with the same sizes or size regions and loadable with different film sorts and including at least one outwardly sensible marking provided on the cassettes of at least one type, at least one sensor arranged to sense the marking with a positioned cassette, and a comparison device which is connected for the sensor for automatic selection of a sheet film size or sort for further loading.

23 Claims, 2 Drawing Sheets

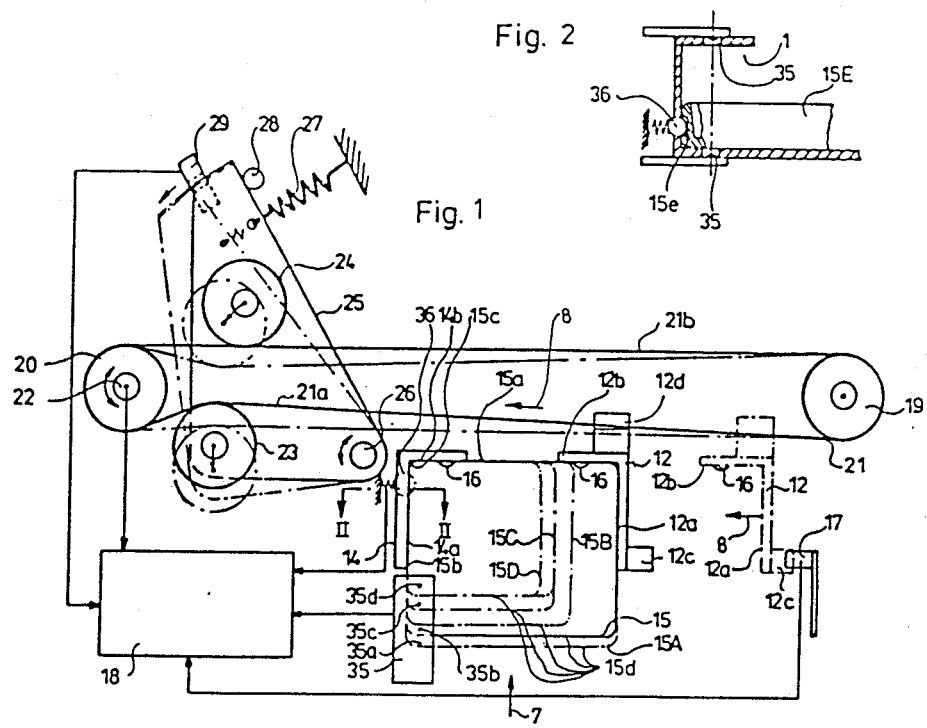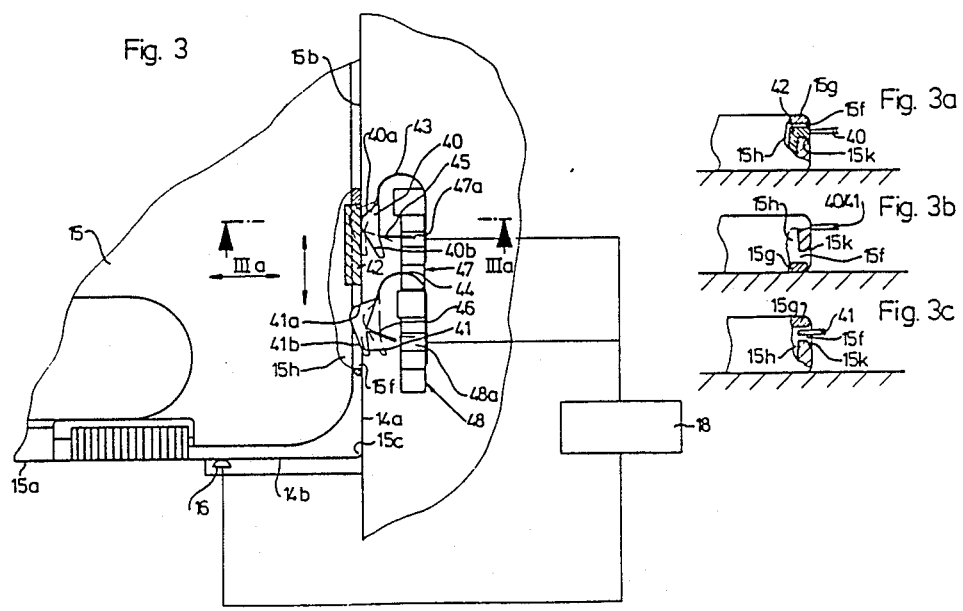

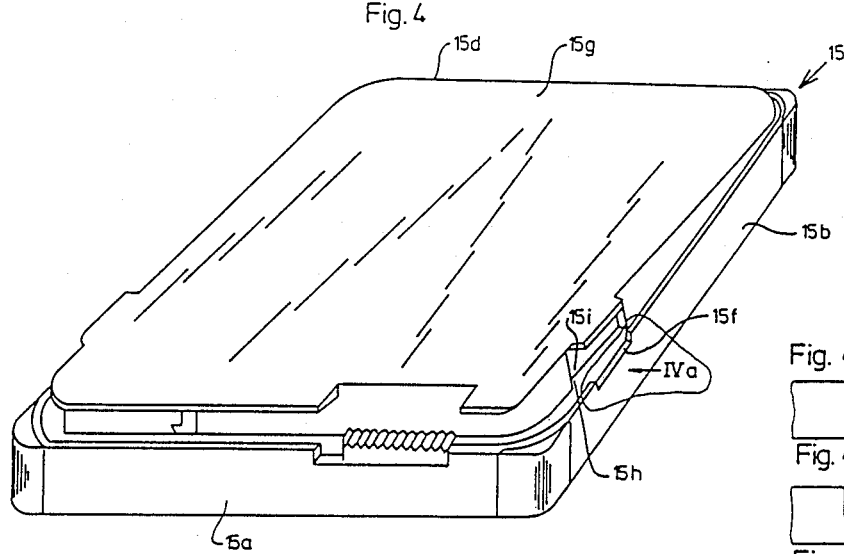
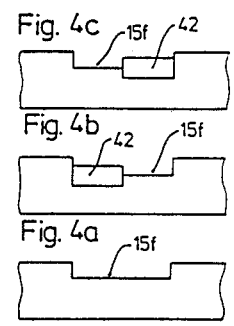

ARRANGEMENT FOR UNLOADING AND LOADING OF X-RAY FILM CASSETTES

BACKGROUND OF THE INVENTION

The present invention relates to an arrangement for unloading and loading x-ray sheet film cassettes of standardized and at the same time different sizes of their flat sides, which can be designed for receiving different sheet film sorts and reloadable with respective sheet film sorts.

Arrangements of the abovementioned general type are known in the art. Such an arrangement has a light-tightly closeable shaft for receiving a cassette, transporting means for insertion and withdrawal of the cassette, means for positioning of the cassette at a cassette corner which is identical for all cassettes, and mechanically-electronic comparison device for determining the format of a cassette, an opening device for the cassette, means for film withdrawal from the cassette and insertion of a new film into the cassette.

An arrangement of this type is known in different variants, and disclosed for example in the Patent Document EP-OS No. 0,052,159 A1. In this arrangement it is however not possible to automatically recognize in mechanical or mechanically-electronic means the film cassettes of the same size which are to be loaded with different film sorts, and to load with a film not only of the correct size but also of the correct film sort.

Another similar arrangement in which the cassettes have different codes which are sensible by different electrical or magnetic electro-optical means in dependence on their size and the film sort contained in them, are disclosed for example in the Patent Documents DE-OS No. 3,533,953, DE-OS No. 3,533,954 or DE-OS No. 3,609,527. When different film formats and film sorts are available, many different codes and respectively many evaluating devices for many different codes are required. Thereby it is not possible for a user to perform the coding itself in correspondence with its specific requirements.

SUMMARY OF THE INVENTION

Accordingly, it is an object of the present invention to provide an arrangement for unloading and loading of x-ray film cassettes, which avoids the disadvantages of the prior art.

More particularly, it is an object of the present invention to provide an arrangement of the abovementioned type with mechanical or mechanically-electronic determination of the cassette format, which has an additional mechanically-electronic possibility of determining different film sorts to be used in the cassettes.

In keeping with these objects and with others which will become apparent hereinafter, one feature of the present invention resides, briefly stated, in an arrangement which is provided with means for automatic distinguishing of cassette types with the same sizes or size regions and loadable with different film sorts and including at least one outwardly sensible marking provided on the cassettes of at least one type, at least one sensor arranged to sense the marking with a positioned cassette, and a comparison device which is connected for said sensor for automatic selection of a sheet film size or sort for further loading.

With the inventive arrangement which includes respective cassettes it is possible with simplest mechanical to automatically determine, in addition to the determination of the format of an inserted cassette also the film sort contained in the cassette or to be provided in the cassette. Furthermore, it is possible with the same mechanical means and the interconnected electronic means, to control automatically whether a cassette is inserted in a proper position (for example with the cover upwardly) or positioned correctly, or when a respective cassette type is not processable in the arrangement. Finally, the mechanical film sort coding is formed so simple that it can be made by a user with adjustment to its requirements in accordance with an operational instruction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view schematically showing a principal embodiment of the inventive cassette unloading and loading device;

FIG. 2 is a view showing the section of the arrangement of FIG. 1, taken along the line II—II;

FIG. 3 is a view showing a cutout of another embodiment of the inventive arrangement;

FIG. 3A is view showing a section of the arrangement of FIG. 2, taken along the line IIIA—IIIA;

FIG. 3B is a view showing a section according to FIG. 3A with incorrectly inserted cassettes;

FIG. 3C is a view showing a section according to FIG. 3A with a different cassette coding;

FIG. 4 is a view showing a perspective reduced picture of a cassette to be used in the arrangement of FIG. 3; and FIGS. 4A–4C are views showing a cutout of the cassette in accordance with FIG. 4 as seen in the direction of IVA with different cassette codings.

DESCRIPTION OF THE PREFERRED EMBODIMENT

An arrangement for unloading and loading of x-ray film cassettes of different format is shown in the drawing, and more specifically the drawings show only those parts of the arrangement which are important for the present invention.

A known shaft for receiving respectively one cassette is identified with reference numeral 1. Transporting means for inserting and withdrawal of a cassette which can be formed as transporting rollers arranged through a shaft bottom, and means light-tight closing of an insert opening of the shaft 1 are not shown. Known means for unlocking of a cassette which reaches an abutment to be described further is arranged at the end side in the shaft 1 and not shown in the drawing. The cassette is spring-biased for example under the action of weak springs. When the cassette cover springs sufficiently far for an unloading or loading, the rotatable cams and the like can serve for complete pressing-on of the cover after a repeated loading of a cassette. They can be designed, however, also for opening and latter repeated closing of the cover. The opening means must be so displaceable in the direction 8 which is transverse to the cassette insertion direction 7, that the opening device is automatically adjustable to the different cassette formats which can be used in the device. At the end side above and/or before the arrangement for opening a cassette, known means for removing a film sheet from the cassette and for inserting a new film sheet in the cassette is arranged. Finally in a known and not shown manner, sheet film supply magazine is provided which contains the films of different formats and types for loading the cassettes of different format to be used in the arrangement. Moreover, in a not shown manner either an intermediate magazine for collecting the films removed from the cassettes, or a developing machine for development of the removed films directly follows.

The determination of the format of a given cassette and the selection and supply of a new film sheet matching thereto is performed automatically after automatic measurement of the length of the both cassette small sides. Before the measurement of the format of a given cassette it must be accurately positioned.

A possible example presented in FIG. 1 for a positioning and measuring device for a cassette side, which is tolerance-free with respect to the unloading and loading device is described in the German Document DE-OS No. 3,544,719. After positioning of a cassette 15 relative to the input device 7, the vertical end side cassette side 15a is determined. Thereby a displacing device which is transverse to the input 7 is required, and it must reciprocate in the direction of the arrow 8. This transverse displacing device has a clamping jaw 12 which is formed as a rectangular angular member 12a, 12b. It simultaneously carries different parts for opening of a cassette 15.

The clamping jaw 12 which is displaceable on a not shown transverse rod is illustrated in FIG. 1 in dash-dot lines in its initial position and in solid lines in its position for a cassette 15 of greater format. The displaceable clamping jaw 12 is displaceable relative to a further clamping jaw 14 which is formed as a rectangular angular member 14a, 14b and is fixed relative to the transverse displacing device 8. The legs 14a, 14b form a lateral and end-side abutment for the cassette 15 which is transported by means of the transporting rollers in the shaft 1. Both clamping jaws 12 and 14 are arranged on the rod so that their legs 12b and 14b facing toward one another are in alignment with one another.

A cassette which is transported directly against the abutments 14a, 14b is simply clamped by movement of the clamping jaw 12 and thereby positioned. A cassette which is somehow positioned between the clamping jaw 14 and the displaceable clamping jaw 12 located in the initial position, is moved during movement of the clamping jaw 12 under the additional action of the transporting rollers against the abutments 14b, 12b and oriented between the legs 14a, 12a. Switching contacts 16 are arranged at the end-side legs 14b, 12b in the event of differently great cassettes. During arrival of a new inserted cassette 15 the switch contacts 16 turn on the drive for a different clamping jaw 12. The switches 16 can be formed for example as light barriers or microswitches. In the initial position of the displaceable clamping jaw 12, a lug 12c of the latter lies in the measuring region of a light barrier 17 or the like, whereby during beginning of the displacing movement of the clamping jaw 12 a counter which cooperates with a computer 18 and a comparison device is turned on.

The drive for the displaceable clamping jaw 12 is provided with a cable line 21 which is guided over two cable rollers 19, 20 in a relatively loose manner. The clamping jaw 12 is mounted on the pulling rope 21 via an angled arm 12d. The driving roller 20 is driven by a not shown stepper motor whose motor shaft 22 can be arranged coaxially with the shaft of the driving roller 20. The driver roller 20 lies in the movement direction 8 of the clamping jaw 12 on a cassette to be positioned 15 before the clamping jaw 12 so that the run of the cable line 21 on which the clamping jaw 12 is mounted, has during the positioning movement the loading run 21a and the opposite run formed as the idle run 21b.

For tensioning the cable line 21 Which is loosely supported via the cable rollers 19, 20, two tensioning rollers 23, 24 are provided. They simultaneously abut against the loading run 21a and idle run 21b and hold the cable line 21 in the tensioned position. The rollers 23, 24 are both supported on a rocker 25 which is turnable about a housing-fixed axle 26 and is pulled under the action of a spring 27 against abutment 28. In this initial position the rocker 25 lies in the region of a light barrier 29. The position of the tensioning rollers 23, 24 which are supported on the rocker is determined so that in this initial poition the load-run-side tensioning roller 23 tensions the cable line 21 on the load run 21a so that the load run 21 performs a bending on the tensioning roller 23. The idle run 21b runs rectilinearly between the cable rollers 19, 20.

When a new cassette 15 appears, the displacing device is turned on by at least one of the switches 16, the stepper motor 22 starts running and moves the clamping jaw 12 via the cable line 21 in the direction of the arrow 8. When the lug 12c leaves the light barrier 17, which is located always in the same position, the counter is turned on. It counts the steps of the stepper motor 22 til its turning off. When the clamping jaw 12 reaches the position in which a cassete 15 of a predetermined side length 15a is positioned, the motor 22 runs first further. Because of the dimensions of spring 27 the positioned cassette 15 is not clamped stronger, but the tensioning of the load run 21a increases and displaces the tensioning roller 23 so long until the loading run 21a runs for example rectilinearly and the idle run 21b performs a bending by the tensioning roller 24. During this displacement of the tensioning roller 23, the rocker 25 is turned under definite tensioning of the spring 27 over a complete determined angular piece. The light barrier 29 is arranged so that exactly after reaching of this turning position the rocker 25 is moved out of the light barrier 29 and the motor 22 is turned off. The counter has measured the steps of the motor between the leaving of the light barrier 17 by the lug 12c and the turning off of the motor during leaving the light barrier 29 by the rocker 25. This number of steps is directly proportional to the predetermined length of the cassette side 15a.

In FIG. 1 the cassettes of different formats to be processed are identified With reference numerals 15, 15A, 15B, 15C, 15D, and 15E. The cassette with the greatest length in direction of the cassette small side 15a, running transversely to the insertion device 7 is identified with reference numeral 15 and shown in solid lines. The remaining cassette types 15A–15D are shown in dash-dot lines, whereas the small side 15a of the type 15A has the same length as the cassette type 15. The length of their perpendicular small side 15b is however greater than that of the type 15. The lengths of the small side 15a and 15b of the cassette types 15B–15D differ from one another in the shown example for illustrating the function of the arrangement, and they are increasingly smaller. It is possible that two smallest cassette types are equal in their side lengths. As for the measuring arrangement, one would proceed as in the event of the cassette type 15 and 15A.

As described the cassettes of all different types 15 through 15D are positioned with their left corner 15c at the end side as considered in the insertion direction, in the shaft at the same location namely toward the angle member 14a, 14b in shaft 1. The positioning device can basically be formed differently also. Also the length of the respective small side 15a which is perpendicular to the insertion direction 7 is evaluated and supplied to the comparison device 18.

It is desirable to determine the respective length of the small side 15b of an inserted cassette 15 through 15E running in the insertion direction 7 in a place-economical manner and with consideration of possible cassette tolerances with simple means, so that the comparison device 18 together with the determined length of the small side 15a can determine also the format of an inserted cassette. For this purpose, as a possible example, a row 35 of light barriers 35a through 35d are arranged parallel to the insertion direction 7 and also parallel to the small side 15b to be determined, so that a cassette oriented at the corner 15c lies between one or several light barriers 35a through 35d. The light barriers 35a through 35d are connected with the comparison device 18. The light barrier 35d is arranged so that it lies near the small side 15d of the smallest cassette type 15D which is parallel to the small side 15a and perpendicular to the small side 15b, and the flat sides of this type lie in the position between them. When a cassette of the smallest type 15D is inserted, only the light barrier 35d is interrupted. The next light barrier 35c lies between the small sides 15d of the smallest cassette type 15D and the next greater cassette type 15C. A positioned cassette of the type 15C interrupts both light barriers 35d and 35c. The next light barrier 35b lies between the smallest sides 15d of the cassette types 15B and 15. A positioned cassette of the type 15B interrupts also only the light barriers 35d and 35c. In connection with the determination of different lengths of the small side 15a for the types 15C and 15B, the comparison device can determine the inserted cassette type in an error-free manner. A positioned cassette of the type 15 interrupts the light barrier 35d, 35c and 35b. In order for the comparison device 18 to distinguish both cassette types 15 and 15A whose side length 15a is identical, an additional light barrier 35a must be provided between the small side 15d of the cassettes of the type 15 and the type 15a, so that the cassettes of the type 15A then interrupt in the positioned condition all light barriers 35a through 35d.

It happens very often that two different cassette types are identical with respect to their small side lengths or small side longitudinal region, however, are different by the film sorts located in them or insertable into them, and/or by different cassette thicknesses since for example in one cassette type a secondary beam dispersion grate is arranged. In this case, the above described determination of the longitudinal region of the small sides of one cassette which are perpendicular to one another is no longer sufficient for distinguishing the cassette types. In this case, the present invention solves the problem. For this purpose, for the cassettes which are identical as to their longitudinal regions of both mutually perpendicular small sides, but of still different cassette types, for example the type 15 and the type 15E in FIG. 2, a marking 15e which can be sensed from outside is provided on the almost identical but still different types as can be seen in FIG. 2. This marking is sensible by a sensor 36 in the shaft 1 in the positioned condition of a cassette. The sensor is connected with the comparison device 18 and signals when the sensor 36 falls into the recess 15e, that it deals with two cassette types of the same size of the flat sides. Thereby by means of the comparison device 18 not only the proper film format, but also the proper film sort of this format is ready for new loading of the cassette. This embodiment is usable when at most two different cassette types to be loaded with different film sorts per cassette format are required. It is naturally possible to provide in the cassettes 15, 15E the recess 15e, and to close in the type 15 the recess 15e by a plug or a pin for distinguishing the two types of a cassette format.

In accordance with another embodiment of the invention, for each cassette format three different cassette types are automatically distinguishable and the respective markings are not only exchangeable when needed, but also are used for determination of the position-correct insertion of a cassette in the arrangement. This embodiment is shown in FIGS. 3-4C.

In this embodiment a slot 15f is provided for the markings on the cassette small longitudinal side 15b, neighboring to the cassette corner 15c to be positioned in each cassette 15c. The slot 15f is formed by a cutout in the said cassette wall part and limited from above in the closed cassette by a cassette cover 15g.

A free space 15h lies behind the cassette wall part which includes the cutout 15f. This free space is limited by a labyrinth rib which is provided at the cassette sides and extends parallel to the small side 15b. A cover-side labyrinth rib 15i engages between the small side 15b and the invisible labyrinth rib with the closed cover 15g. Between the labyrinth rib 15i and the cassette wall part which forms the small side 15b, so much space remains that the arrangement-side sensor 40, 41 can fall deeply into the slot 15f or sliders 42 for partial sensing of the slot 15f are inserted over the slot lower edge which has outwardly an incline 15k.

The sliders 42 have a shape which is complementary to the slot lower edge 15k and are substantially U-shaped, so that they are insertable over the slot lower edge to coincide with the outer surface of the small side 15b and to cover the slot 15f over its length. In accordance with the shown example, the slot 15f has the length of two sliders 42, and the sensors 40 and 41 are spaced from apart from one another by such a distance that with the positioned cassette 15 either both can fall into the slot 15f or the respective sensor 40 or 41 which take place at the slider 42 inserted in the slot 15f, cannot fall into the slot 15f. In FIG. 3 the sensor 40 is pressed back by the slider 42. In the shown example, three different markings for a cassette format are possible, or in other words, three cassette types of different contents are distinguishable. One cassette type is marked so that no slider 42 is inserted in the slot 15f so that both sensor 40 and 41 can fall into it. The second cassette type is marked so that one slider 42 near the end side 15a can be inserted into the slot 15f, so that only the sensor 40 can fall into the slot 15f. The third cassette type is marked so that a slider 42 which is removed from the end side 15a can be inserted into the slot 15f, and only the sensor 41 can fall into the slot 15f as can be seen from FIGS. 3, 3A and 3C.

The coding of different cassette types of one format is performed for all useable formats so that at least one or both sensors 40 and 41 can fall into a free part of the slot 15a in the event of correct positioning of the cassette and also correcty inserted cassettes. As will be described later on, the sensors 40 and 41 are connected with the comparison device 18 so that during falling of a sensor 40 or 41 into a free part of the slot 15f, a signal is produced on the comparison device 18 for a correctly inserted, correctly positioned cassette to be processed in the arrangement.

When for example in FIG. 3B the cassette is incorrectly inserted in the arrangement, for example, with the cover 15g upwardly or generally a not processable cassette, no sensors 40, 41 fall into the slot 15f. The comparison device 18 obtains a signal for a not processed cassette and transports it away from the arrangement.

The sensors 40, 41 have the shape of two wedge surfaces 40a, 40b or 41a, 41b which run opposite to one another and against the cassette small side 15b or the slot 15f. They are pretensioned on the spring arms 43, 44 against the cassette small side 15b. A lug 45 or 46 is connected with each sensor 40 or 41 and during falling of the sensors 40 or 41 into the associated part of the slot 15f, projects outwardly of a light barrier 47a or 48a. The light barriers 47a or 48a are connected each with an evaluating device 47 and 48, respectively which supply their results to the comparison device 18. Depending on the position of the sensors 40 and 41, the comparison device 18 processes the information of the processable or not processable cassette and the film sorts contained in the respective cassette type. In the event of availability of a processable cassette, the order is obtained from the comparison device 18 for the dispenser magazine required in accordance with film size and film sort, for further loading of the cassette.

It is to be understood that it is also possible to make the slot 15f even longer for inserting three or more sliders 42. In this case a respective number of sensors 40, 41, etc. must be provided in the arrangement. The wedge-shaped 40b or 41a, 41b has the advantage that the sensors 40, 41 can be easily inserted into or withdrawn from a free part of the slot 15f during insertion of a cassette when it moves in direction of the arrow 7 and 8. It is also possible to provide two or more openings in the cassette small side in correspondence with the recess 15e, formed as recesses for providing the markings, and also on the end-side cassette small side 15a. They can be closed by small plugs when needed. This film sort coding can be performed at the start in acccordance with respective requirements by a user itself.

It will be understood that each of the elements described above, or two or more together, may also find a useful application in other types of constructions differing from the types described above.

While the invention has been illustrated and described as embodied in an arrangement for unloading and loading of x-ray film cassettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for unloading and loading of X-ray sheet film cassettes which have flat sides with standarized but different sizes and which also can be used for receiving different sheet film sorts and reloadable with respective sheet film sorts, the arrangement comprising a light-tight closable shaft for receiving a cassette; transporting means for inserting and withdrawing of the cassettes; means for positioning the cassette so that one corner of cassettes of different types is positioned at the same location; a mechanically-electronic comparison device for determining a format of a cassette; a device for opening the cassette; means for withdrawing a film and inserting of a new film into the cassette; and means for automatically distinguishing cassette types with the same sizes or size regions and loadable with different film sorts, said automatically distinguishing means including at least one outwardly sensible marking provided on the cassettes of at least one type, at least one sensor arranged to sense the marking with a positioned cassette, and a comparison device which is connected with said sensor for automatic selection of a sheet film size or sort for further loading.

2. An arrangement as defined in claim 1; and further comprising second such markings and second such sensor arranged to sense said second markings and also connected with said comparison device.

3. An arrangement defined in claim 2, wherein said automatic distinguishing means has a plurality of light barriers, said sensors having lugs which depending upon the position of said sensors, cooperate with said light barriers.

4. an arrangement as defined in claim 3, wherein said automatic distinguishing means includes an evaluating device, said sensors forming a first group of elements and said light barriers forming a second group of elements, the elements of at least one of said groups of elements being connected with said electronic evaluating device, said electronic evaluating device being connected with said comparison device.

5. An arrangement as defined in claim 4, wherein the elements of the other of said groups of elements are also connected with said electronic evaluating device.

6. An arrangement as defined in claim 1, wherein said marking is formed as at least one recess arranged so that with the positioned cassette said sensor is located opposite to said recess and spring biased for engagement into the latter.

7. An arrangement as defined in claim 6, wherein for adjusting said marking for the cassettes of the same size for the cassette types containing different film sorts, said recess is at least partially closeable; and further comprising means for at least partially closing said recess.

8. An arrangement as defined in claim 7, wherein said recess is completely closeable.

9. An arrangement as defined in claim 7, wherein said closing means includes at least one plug.

10. An arrangement as defined in claim 7, wherein said closing means includes at least one slider.

11. An arrangement as defined in claim 7, wherein said automatically distinguishing means includes a plurality of such sensors extending over a sensing region, said recess being formed as a slot in a cassette small side and having a length extending over said sensing region and also having partial regions which are associated with a respective one of said sensors and some of which are closed; and means for closing some of said regions of said slot.

12. An arrangement as defined in claim 11, wherein said slot has a wall part which limits the same and extends from said slot outwardly to form an incline, and a free space provided behind said wall part, said closing means including a slider which is U-shaped and complementary to said incline and which is insertable over said wall part in alignment with a cassette outer side.

13. An arrangement as defined in claim 11, wherein said sensor is provided with two wedge surfaces which extend toward one another and against said slot.

14. An arrangement as defined in claim 11, wherein different cassette types of the same size or the same size region are provided with at least one such unfilled recess formed as a slot at different locations, which slot lies in an operational region of said at least one sensor only when a cassette is inserted and positioned properly in the arrangement, and when said sensor is not available in said slot said evaluating device supplies to said comparison device a signal for a not processable cassette.

15. An arrangement as defined in claim 6, wherein different cassette types of the same size or the same size region are provided with at least one such unfilled recess at different locations, which recess lies in an operational region of said at least one sensor only when a cassette is inserted and positioned properly in the arrangement, and when said sensor is not available in said recess said evaluating device supplies to said comparison device a signal for a not processable cassette.

16. An arrangement as defined in claim 6, wherein said sensor is provided with two wedge surfaces which extend toward one another and against said recess.

17. An arrangement as defined claim 1, wherein said sensor is formed as a spherical arresting member.

18. An arrangement as defined in claim 1; and further comprising a light barrier, said sensor having a lug which depending on the position of said sensor, cooperates with said light barrier.

19. A cassette for an arrangement of claim 1, wherein for adjusting said marking for the cassettes of the same size for the cassette types containing different film sorts, said recess is at least partially closeable; and further comprising means for at least partially closing said recess.

20. A cassette as defined in claim 19, wherein said recess is completely closeable.

21. A cassette as defined in claim 19, wherein said closing means includes at least one plug.

22. A cassette as defined in claim 19, wherein said closing means includes at least one slider.

23. A cassette as defined in claim 19, wherein said automatically distinguishing means includes a plurality of such sensors extending over a sensing region, said recess being formed as a slot in a cassette small side and having a length extending over said sensing region and also having partial regions which are associated with a respective one of said sensors and some of which are closed; and means for closing some of said regions of said slot.

* * * * *